Dec. 15, 1931.  A. A. BULL  1,836,308
FILTER
Filed Feb. 18, 1928
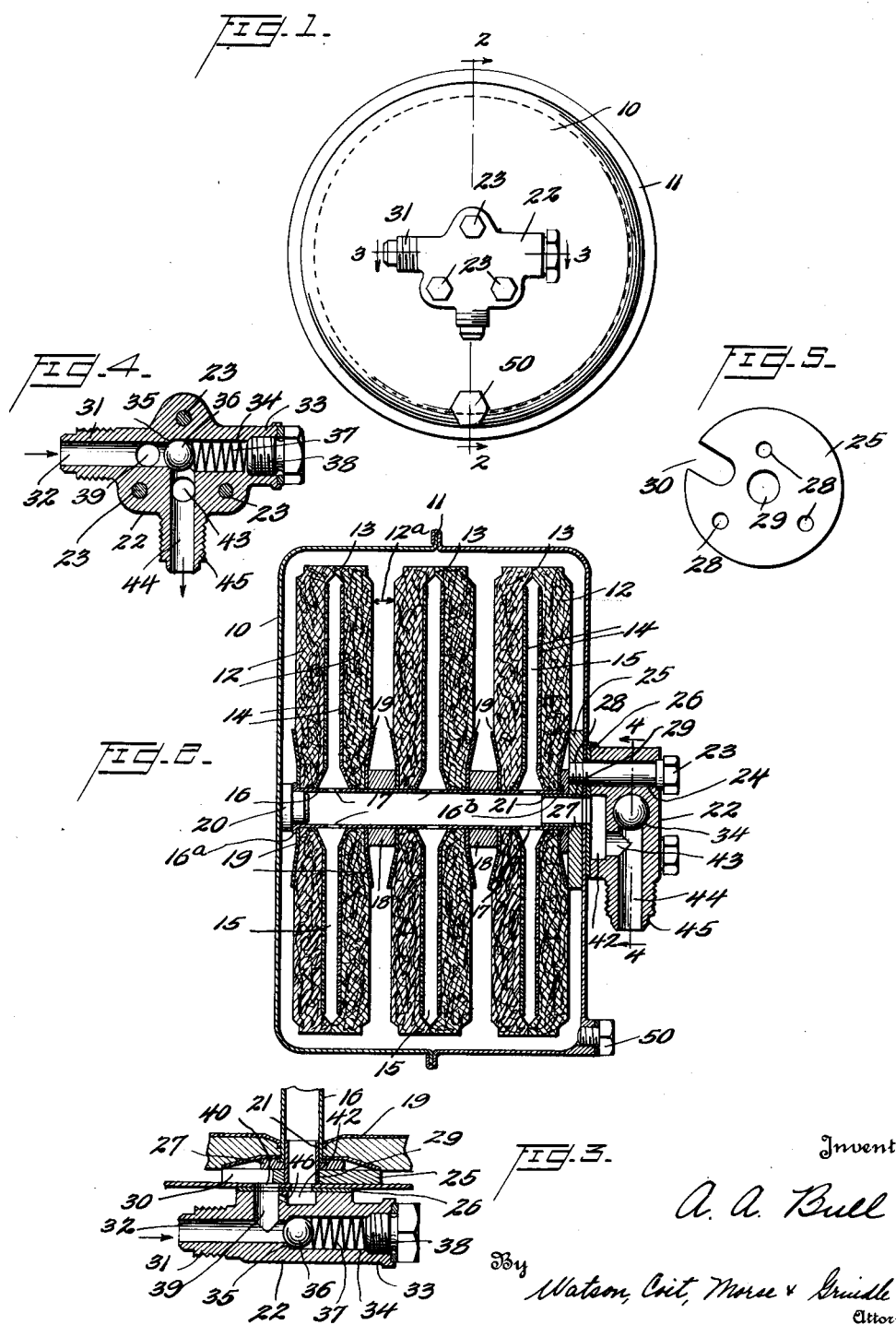
Inventor
A. A. Bull
By Watson, Coit, Morse & Grindle
Attorneys Patented Dec. 15, 1931

1,836,308

UNITED STATES PATENT OFFICE

ARTHUR A. BULL, OF DETROIT, MICHIGAN, ASSIGNOR, BY MESNE ASSIGNMENTS, TO HANDY CLEANER CORPORATION, OF DETROIT, MICHIGAN, A CORPORATION OF MICHIGAN

FILTER

Application filed February 18, 1928. Serial No. 255,360.

The present invention relates to filters and more particularly to the type of filter adapted for keeping clean the oil employed for lubricating internal combustion motors, such as the motors used in motor vehicles.

One of the principal features of the invention resides in the means whereby oil is supplied to the bearings to be lubricated under all conditions. This feature has particular utility in connection with a filter which is installed so that all of the oil discharged from the oil pump is delivered to the filter and then passes to the bearings. In a filter of this type, means is provided so that if the filter becomes stopped up or clogged or the viscosity of the oil is too great to flow through the filter, a check valve or similar device is opened which bypasses the oil around the filter and discharges it directly to the bearings. If this check valve is set to open at a pressure which provides for an efficient operation of the filter, the pressure produced by the oil pump when the engine is idling will not be sufficient to either force the oil through the filter or open the check valve to bypass it. According to the present invention, means is provided so that oil is supplied to the bearings, even when both of these conditions prevail, that is, the resistance of the filter is too great for the oil to pass through and the pressure of the oil delivered by the pump is not sufficient to open the check valve.

Another feature of the invention resides in the provision of an exceedingly efficient filter, which will operate for a long time without attention, and yet occupies a minimum space.

Another feature of the invention is the provision of filtering elements which filter very efficiently and the life of which is greater than with the elements heretofore provided.

Another feature of the invention is the provision of a filter which will withstand high pressures.

Other objects and features of novelty will be apparent from the description taken in connection with the drawings, in which:

Figure 1 is a front elevation of a filter constructed in accordance with the present invention;

Figure 2 is a horizontal cross-sectional view taken substantially on the line 2—2 of Fig. 1;

Figure 3 is a horizontal cross-sectional view of the fitting secured to the casing of the filter and having the various inlet and outlet passages therein, said section being taken substantially on the line 3—3 of Fig. 1;

Figure 4 is a vertical sectional view through this fitting and taken substantially on the line 4—4 of Fig. 2; and Figure 5 is an elevation of the attachment plate.

Referring to the drawings, wherein the same reference characters in the different views indicate the same parts, it will be seen, in the form of the invention illustrated, that the filter comprises a casing 10, preferably made of sheet metal and formed of two parts, which may be drawn stampings, suitably flanged, as indicated at 11, one of said flanges being broader than the other, and in assembling the casing, being bent around the shorter by pressing, whereby the casing is sealed to withstand high pressures.

According to the present invention, the filtering is effected by means of relatively thick pads of porous material, such as felt, the thickness of the pads being such that the filtering action is progressive, that is to say, the foreign matter in the oil does not pass through the pads, but penetrates the same to varying degrees. To give an idea of the thickness of these pads, it may be said that preferably they are at least a quarter of an inch thick.

As shown, the filtering elements, disposed within the casing, consist of a plurality of pairs of said pads 12. In the drawings, three pairs are shown, but obviously the number of pairs of elements will depend upon the liquid being filtered, and the service required. As shown, the pairs of pads are disposed transversely of the axis of the filter casing, the pads of each pair being mounted parallel to each other and slightly spaced and closed or secured together at their outer adjacent edges to thereby form a chamber 15 between ths two pads. The outer adjacent edges of the pads may be secured together in various ways, as by stitching, as indicated at 13. Obviously the outer wall of the chamber 15 may be provided in other ways. In order to properly space the pads of each pair, foraminous plates or screens 14, mounted on a central support or tube 16, are provided. Each of the chambers 15 has communication with the interior of the tube 16, and for this purpose openings or holes 17 are provided. To prevent leakage along the contact surface between the tube 16 and the pads, outer dished perforated washers 19 are provided and the interior pairs of these washers are held properly spaced by means of collars 18. The outer washers 19 are held in place on the tube 16 in any suitable manner, as by forming flanges 16a and 16b on the ends of the tube.

The filtering unit just described is mounted within the casing and supported centrally therein in any suitable manner, as by means of the pin 20 at one end and the nipple or short tube 21 at the other. The pin 20 is secured to one end wall of the casing 10, at its center, and is provided with a reduced portion fitting within the end of the tube 16. Similarly the nipple 21 engages within the other end of the tube 16 and is supported by the plate 25 described more in detail hereinafter.

The distance 12a between the pad of one pair and the adjacent pad of the next pair is relatively slight, and, in fact, when the filter elements are first assembled, this space may be practically nothing, the adjacent surfaces of the adjacent pads being in contact. After the filter has been put in operation, these adjacent surfaces will separate, providing the space 12a.

Inlet and outlet passages or conduits are provided so that the oil or liquid may be circulated through the filter. As shown in the drawings, these passages are provided in a single fitting 22 secured against one end wall of the casing 10 by means of the cap screws 23. These screws pass through openings 24 in the fitting, and through registering openings in the gasket 26 and end wall of the casing, and are screwed into tapped holes 28 in an inner plate 25, the plate 25 and fitting 22 being on opposite sides of the end wall of the casing. When the screws 23 are tightened, the end wall of the casing is clamped between the plate 25 and the fitting 22, thereby securely fastening the fitting to the casing and providing against leakage. The plate 25 is provided with a central aperture 29 in which is seated the nipple 21; and thus this end of the central tube 16 is supported within the casing. The plate is also formed with a notch 30 which registers with an opening 40 in the end wall of the casing, and communicates with the inlet conduit of the fitting.

The fitting has a threaded boss 31 to which the discharge pipe from the pump is connected, and further is formed with a central bore 32 extending entirely through the fitting. The portion of the bore 32 at the end 33 of the fitting opposite the end 31 is counterbored as at 34, providing a shoulder 35 against which is seated a ball 36 pressed against the shoulder 35 by a spring 37 which in turn abuts a plug 38 screwed in the end of the counterbore. These parts form the check valve the function of which is described hereinafter.

In operation, the oil discharged from the pump flows through the bore 32 into a cross bore 39 which registers with the opening 40 in the casing. Then the oil passes through the notch 30 into the casing and around the filter unit. Then it flows through the filter pads into the central oil space formed by the chambers 15 and interior of the tube 16. The bore of the tube communicates with a passage 42 in the fitting through the opening 29 in the plate 25 and registering openings in the end wall of the casing 10 and the gasket 26. As shown in the drawings, the passage 42 is in communication with the outlet passage or bore 44 in the fitting through the short bore 43. Bore 44 at its upper end communicates with the counterbore 34 already described. When the pressure on the ball 35 is sufficient to move it from its seat, the oil will pass directly from inlet conduit 32 to the outlet conduit 44, without circulating through the filter.

The outlet pipe for conducting the oil from the filter to the bearings is screwed onto the threaded end 45 of the fitting.

In order to hold the end washer 19 in proper position relative to the plate 25, a spacer 27 is inserted between these parts.

As shown in Fig. 3, the inlet passage 39 and outlet passage 42 are connected by a bleeder passage 46 of relatively small diameter. This bleeder passage insures that at least a small quantity of oil will always be supplied to the discharge pipe and the bearings regardless of whether the filter is clogged and the check valve closed, or not.

The amount of oil circulated through the filter depends on several conditions, such as the volume of the oil pumped, the viscosity of the oil, and the resistance of the filtering element, which varies and increases as it becomes contaminated. When the filter is first used, it will have a minimum resistance and this will increase as the filter becomes contaminated. Obviously the filter will offer greater resistance to a heavy oil than to a light oil.

Where all of the oil discharged from the pump is delivered to the filter and then passes to the bearings, it is necessary to provide means whereby oil will be supplied to the bearings if the filter becomes clogged. Heretofore this has been accomplished by the provision of a check valve such as the valve 36 described herein.

The amount of oil circulated through the filter and the length of the life of the filter elements, depend upon the difference in the pressures established on opposite sides of the filter element. Ordinarily the check valve must be set so that it will open even under the conditions of minimum pressure in the supply pipe, since, otherwise no oil would be supplied to the bearings if the filter became clogged.

In present day automotive practice the lubricating systems operate at pressures varying from small amounts such as five pounds up to as high as seventy-five pounds or more. In a motor wherein the lubricating system operates at, say twenty-five pounds under normal conditions, the characteristics of the oil pump may be such that the pressure will drop to as low as five pounds at idling speed. If the relief valve were set at about twenty pounds to maintain the difference of pressures on the two sides of the filter, the valve would not open at idling speed, and furthermore, no oil would be passed through the filter at such speed, because the pressure produced by the pump would not be sufficient to force it through the filter. Hence no oil would be delivered to the bearings. If the check valve were set to open at five pounds pressure, then no substantial amount of oil would pass through the filter at any time, since five pounds is insufficient pressure to force oil through the filter, and if the pressure becomes greater, the check valve would open, bypassing the oil around the filter element.

One of the important features of the present invention is the provision of means whereby the check valve can be set to maintain a proper pressure and at the same time oil will be supplied to the bearings regardless of whether or not the filter is clogged and the check valve closed.

According to the present invention the check valve 35 is set to open at the proper pressure for the best operation of the filter and system, and oil is continuously supplied to the discharge pipe of the filter through the bleeder opening 46. Hence if the pressure produced by the pump is not sufficient to force oil through the filter or to open the check valve, nevertheless a small quantity of oil will be supplied to the bearings through the bleeder hole 46. This hole is designed of such size as to deliver sufficient oil at the idling speeds of the motor. As the speed of the motor increases, and also the pressure of the oil discharged by the pump, the bleeder opening or orifice will offer a proportional increased resistance to the flow of oil therethrough so that the difference of pressures on opposite sides of the filtering element is not materially affected by this bleeder.

The interior unit of the filter is made by assembling the parts on the tube 16 and then spinning over or flanging the ends of the tube at 16a and 16b. In assembling the complete filter the interior unit and other interior parts such as the plate 25 are positioned in the two sections of the casing 10, with the flanges 11 thereof contacting and then the flanges are secured together as by bending one over the other or welding or both.

The filter is designed to be cleaned without separating the parts thereof. For this purpose the outlet pipe is disconnected from 45 and this is connected with a supply of cleaning fluid such as gasoline, kerosene or air, under pressure. The fluid flows through the pads in a reverse direction and drains through a drain opening closed by plug 50.

In operation, the liquid to be filtered, such as oil, is delivered to the inlet conduit 32. It passes through the passage 39 into the interior of the casing 10 and fills the space around the filter elements. Then it flows through the filter pads into the oil space formed by the chambers 15 and the interior of tube 16. The filtered oil is discharged from the filter through the passages 42, 43 and 44. If the filter becomes clogged or the viscosity of the oil is too great because of cold weather or other circumstances, the check valve 36 will be opened and oil will be bypassed around the filter directly to the bearings. If the pressure produced by the pump is not sufficient, either to force oil through the filter, or open the bypass valve, the bearings are still supplied with oil by the bleeder opening 46.

Although one form of the invention has been described in detail, it is to be understood that it is not limited to the exact construction disclosed, but includes modifications and changes coming within the scope of the appended claims.

Having thus described the invention, what is claimed as new and desired to be secured by Letters Patent is:

1. A filter of the character described, having inlet and outlet conduits and a passage providing communication between the same, means sealing said passage opened when the difference in pressures in the said conduits exceeds a predetermined amount, and an unobstructed small bleeder passage connecting said conduits and calibrated to deliver the minimum quantity of oil required by apparatus supplied from the filter.

2. A filter comprising a casing, filtering means within said casing, a fitting having an inlet and an outlet for said casing, a relief bypass within said fitting, a valve therein adapted to open when the difference in pressures between said inlet and said outlet exceeds a predetermined amount, and a smaller calibrated bypass having no valve.

3. A filtering unit for filtering the oil of internal combustion engines, comprising in combination, a tube, pairs of filtering pads mounted on the tube transversely to the axis thereof, the pads of each pair being formed of felt stitched together throughout their peripheries, spaced perforated plates between the pads of each pair forming a chamber therebetween, means providing communication between each chamber and the interior of the tube, spacers on the tube between the pairs and means to progressively compress each pad from a position beyond the spacers to the tube.

4. A filtering unit for filtering the oil of internal combustion engines, comprising in combination, a tube, pairs of filtering pads mounted on the tube transversely to the axis thereof, the pads of each pair being formed of felt stitched together throughout their peripheries, means spacing the pads of each pair forming an oil chamber therebetween, means providing communication between each chamber and the interior of the tube, spacers on the tube between the pairs, washers partially covering the end pads of the group, the ends of the tube being expanded to hold the washers in place and the pads against the spacers to prevent leakage.

5. In a filter unit, in combination, filter elements mounted on a tube and communicating therewith, a two part casing having the parts secured together to enclose the said elements, a stud mounted in one of said casing parts and adapted to close one end of said tube and support it, and a nipple carried by the other part of the casing and adapted to telescope with the tube for conducting filtered liquid therefrom and to support that end of the tube whereby the elements are kept clear of the casing walls.

6. In a filter unit, in combination, filter elements mounted on a tube and communicating therewith, a casing surrounding said elements, a stud on an inner wall of the casing closing one end of the tube, a nipple on an inner wall of the casing and telescoping with the opposite end of said tube to conduct filtered liquid therefrom, said stud and nipple forming the sole supports for the tube and elements, and a fitting secured to the outside of the casing and communicating with the nipple and the interior of the casing.

7. A filter of the class described, comprising in combination, a casing having an inlet and an outlet, and a series of thick coherent filter pads of fibrous fabric mounted in said casing in pairs with their peripheries secured together, perforate means within each pair for holding the central portions of the pads in spaced relation to form a chamber therebetween, said chambers being interconnected and in communication with said outlet, and said inlet being in communication with the space within the casing exteriorly of said pads, spacing means between adjacent pairs of pads, and perforated washers between the spacing means and the adjacent surfaces of the pads and extending out beyond said spacing means in contact with said pads.

In testimony whereof I hereunto affix my signature.

ARTHUR A. BULL.